United States Patent [19]

Berczi et al.

[11] Patent Number: 4,739,814
[45] Date of Patent: Apr. 26, 1988

[54] RADIAL TIRE

[75] Inventors: Charles N. Berczi, Ormskirk, United Kingdom; Werner K. Hess; Herbert J. Löhr, both of Ghent, Belgium

[73] Assignee: Milliken Industrials Limited, United Kingdom

[21] Appl. No.: 638,532

[22] Filed: Aug. 6, 1984

Related U.S. Application Data

[63] Continuation of Ser. No. 473,886, Mar. 10, 1983, abandoned.

[51] Int. Cl.⁴ .............................................. B60C 9/28
[52] U.S. Cl. .................................. 152/527; 152/536; 152/538
[58] Field of Search ................. 156/128.6, 130, 130.3; 152/358, 361 DM

[56] References Cited

U.S. PATENT DOCUMENTS 4,277,296 7/1981 Skidmore .......................... 152/358
4,284,117 8/1981 Poque et al. ................ 152/361 DM

OTHER PUBLICATIONS

DuPont Technical Information, "Kevlar © Aramid", Bulletin K-1, Dec. 1974.

Primary Examiner—Jerome Massie
Assistant Examiner—Ramon R. Hoch
Attorney, Agent, or Firm—Earle R. Marden; H. William Petry

[57] ABSTRACT

There is described a novel fabric for use in tire building. The fabric is of open square construction and has a tackified finish to ease construction of tire carcases. A method of making the fabric is described as well as a method of making a tire using the fabric.

6 Claims, 3 Drawing Sheets

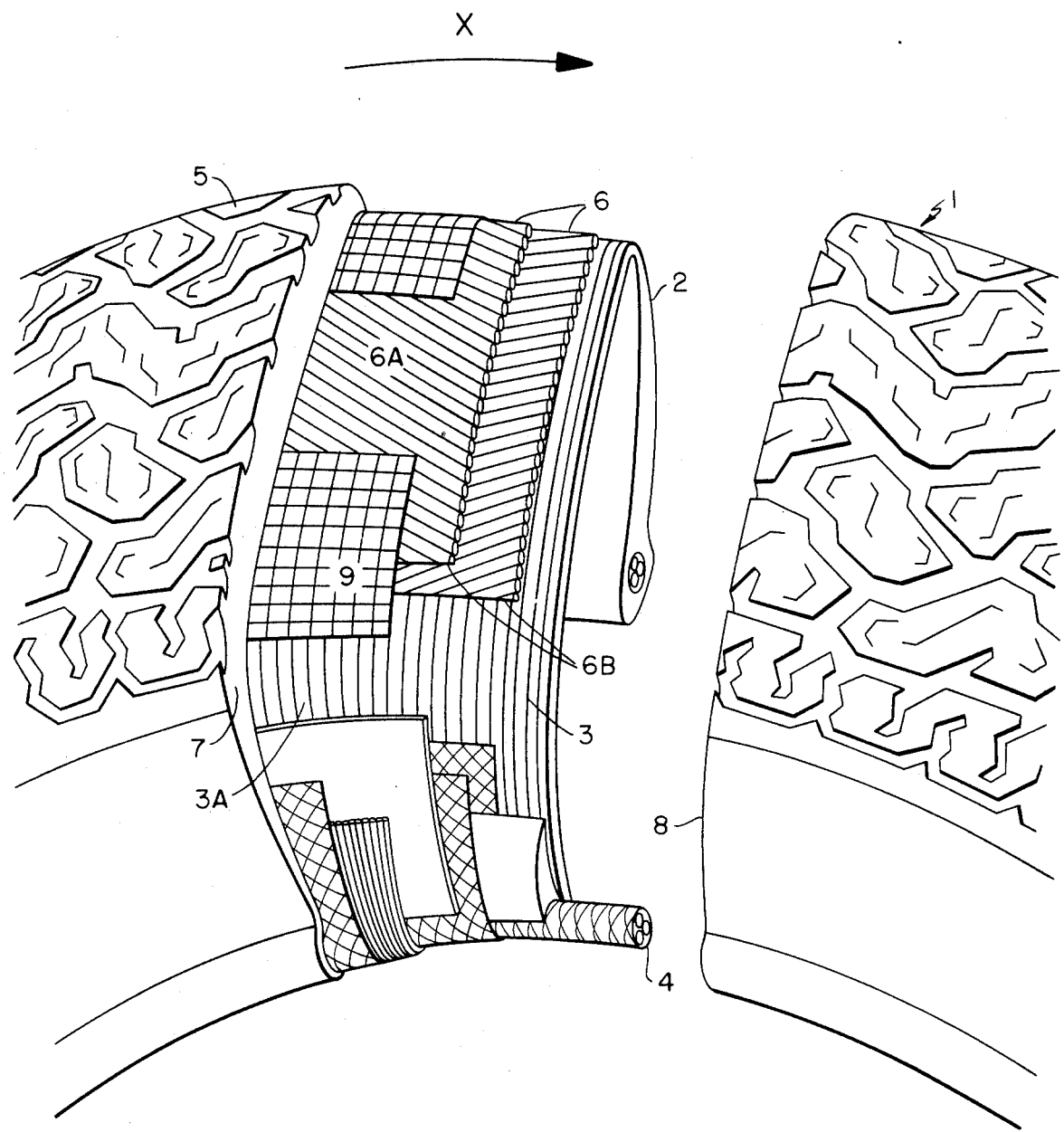
FIG.-1-

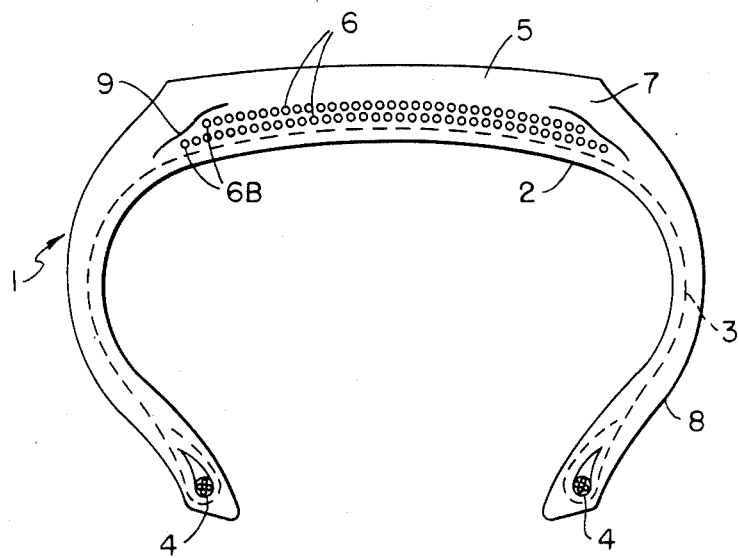
FIG.-2-

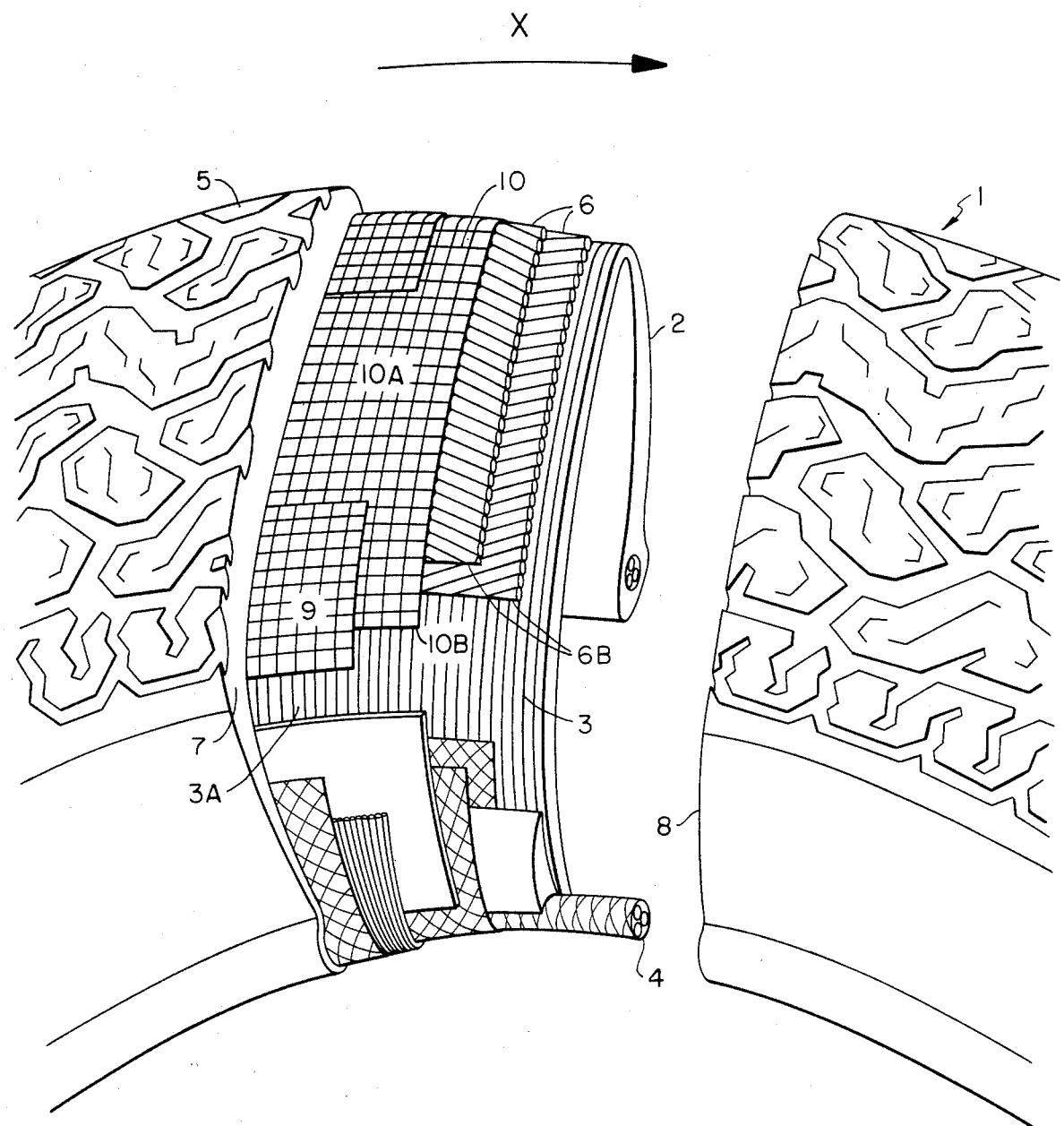
FIG. -3-

RADIAL TIRE

This is a continuation of U.S. Ser. No. 473,886, filed 3/10/83, now abandoned.

BACKGROUND OF THE INVENTION

This invention relates to pneumatic tires and to fabrics for use in building pneumatic tires.

At the present time most pneumatic tires for passenger vehicles are of the radial ply type as described below and fall into three classes namely SR, HR and VR which are tested to operate at speeds up to 180, 210 and over 210 kilometers per hour, respectively. Radial ply type passenger tires are in the main manufactured from a single or multiply carcass of substantially U-shaped section having metal beads at the inner perimeters of the walls. In such a radial ply tire construction the carcass is formed from a rubberised woven fabric having relatively inextensible reinforcing cords running transversely, i.e. radially, from bead to bead. A carcass constructed in this manner requires to be supported in the area of the tread. Commonly this support is provided by two or more steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties.

In view of the severe speed tests mentioned above, technical difficulties have been encountered in incorporating steel belts into the tread area of the tire. One of the difficulties lies in ensuring good adhesion between the steel and the rubber. When first introduced such steel belted tires were susceptible to tread chunking at high speed due to temperature build-up causing the rubber to degrade to an extent which impaired the adhesion between the steel belt and the rubber tread. This breakdown was particularly prevalent at the edges of the steel belt where excessive temperature build-up takes place, leading to progressive adhesion failure and irregular and severe tread wear in the shoulder area of the tire.

Two solutions to the aforementioned problem have been proposed. The first solution comprises forming a secondary carcass over the steel belt plies using one or two plies of calendered nylon tire cord extending circumferentially around the tire and across the surface of the steel belt and beyond the edges thereof. The tire cord is disposed with its relatively inextensible warp running around the perimeter of the steel belt in the intended direction of rotation of the tire. The addition of this tire cord is commonly known as a "cap-ply", "overlay" or "nylon cording". One example of this solution is disclosed in U.S. Pat. No. 4,284,117.

The second solution comprises utilising two or more steel belt plies in which the edge of each ply is folded upon itself.

Both of the aforementioned solutions are expensive in that they utilise relatively large amounts of either calendered nylon cord or steel cord and, in the second solution, tire building problems can occur both in the folding of the steel belts and in the accurate positioning of each ply of the belt. Furthermore, both solutions inevitably result in a relatively heavy construction.

SUMMARY OF THE INVENTION

An object of the present invention is to obviate or mitigate the aforementioned disadvantages by providing a pneumatic tire and a fabric for use in tire construction which provides improved stability, good mechanical and chemical adhesion, cost savings during tire building and a fabric weight saving without adversely affecting the properties of the tire in relation to ride-comfort, noise and rolling resistance.

According to the present invention there is provided a fabric for use in tire building and comprising an open square construction having a tackified finish, a warp set in the range of 12 to 130 threads per decimeter and a weft set in the range of 15 to 70 threads per decimeter.

Preferably, the fabric is formed from yarns with counts in the range of 440 to 2500 decitex.

The warp and weft may be twisted, folded or texturised and may be rayon, nylon 6, nylon 66, polyester or aramid and the fabric may be formed by conventional or leno weaving or warp inlay and weft insertion knitting.

The tackified finish is preferably achieved by application of an aqueous blend of resin and rubber latices or, alternatively, tackifying may be achieved by application of a solvent solution of unvulcanised rubber compound.

The fabric may be applied as a cap-ply extending across the steel belt and over the edges thereof.

Alternatively, according to the present invention there is provided a method of constructing steel belted radial ply tires and comprising applying strips of the fabric according to the invention over the edges of the steel belt as the carcase is being built.

Still further according to the present invention there is provided a pneumatic tire constructed as aforesaid.

DESCRIPTION OF THE DRAWINGS

An embodiment of the present invention will now be described, by way of example, with reference to the accompanying drawings, in which:

FIG. 1 is a cut-away section of part of a pneumatic radial ply tire;

FIG. 2 is a cross-sectional view corresponding to FIG. 1; and

FIG. 3 is a view corresponding to FIG. 1 illustrating a modified embodiment.

DESCRIPTION OF THE EMBODIMENTS

Referring now to the drawings, a radial ply tire indicated generally at 1, comprises a carcass 2 formed from one or more plies of tire cord 3 terminating at the inner periphery of the tire in metal beads 4. The tire cord 3 is a rubberised woven fabric having its warps formed from relatively inextensible reinforcing cords, indicated generally at 3a. In the radial ply tire shown in FIG. 1 the carcase 2 is constructed so that the reinforcing cords are running substantially radially of the intended direction of rotation X of the tire 1. Support is provided to the carcass 2 in the area of the tread 5 of the tire by two or more woven steel cord belt plies 6. The belt plies 6 are formed with relatively inextensible steel cord reinforcing warps, indicated generally at 6A, which run in the intended direction of rotation X of the tire or, more usually, at a slight angle thereto. The belt plies 6 extend across the width of the tread 5 of the tire terminating in edges 6B in the shoulder portion 7 of the tire i.e. the area where the tread 5 meets the side wall 8.

A shoulder cap ply 9 is provided which extends over the edge 6B of the belt plies 6. The shoulder cap ply 9 comprises a fabric having an open square construction and a tackified finish so that during tire building a strip approximately 5 centimeters wide can be readily applied across the edge 6B to adhere to the belt ply 6 and the tire cord 3 of the carcass.

The shoulder cap ply fabric 9 may be manufactured by conventional weaving, leno weaving, or warp inlay and weft insertion knitting from untwisted, twisted, folded, or texturised rayon, nylon 6, nylon 66, polyester or aramid yarns having a yarn count between 440 and 2500 decitex. The warp may have a set in the range of 12 to 130 threads per decimeter and the weft a set in the range of 15 to 70 threads per decimeter. The weft should lie at right angles to the warp.

The fabric is slit into strips approximately 5 centimeters wide and has a tackified finish to facilitate adhesion during building. This tackified finish is achieved by coating the fabrc with an aqueous blend of resin and rubber latices or, alternatively, with a solvent solution of an unvulcanised rubber compound.

In one specific example the shoulder cap fabric 9 is formed by plain leno weaving with a warp set of 48 threads per decimeter and a weft set of 22 threads per decimeter. The warp is a 1100 decitex polyester yarn with a twist of 100 t.p.m. and the weft is a 470 decitex textured nylon. The fabric is 0.79 mm. thick and has a weight of 90 gm/sqm.

In a modified embodiment the shoulder cap fabric 9 can extend across the entire width of the steel belt plies while still overlapping the edge portions 6B of the latter.

An alternative construction is shown in FIG. 3 for use in tires designed for higher speeds i.e. HR and VR specification. In this construction a standard cap ply 10 is provided which extends across the width of and overlaps the edge 6b of the belt plies 6. On top of the full width cap ply 10, shoulder cap plies 9 are provided. These shoulder cap plies extend over the edges 6B of the belt plies 6 as well as over the edges of the full width cap ply 10. In some constructions the layer of shoulder cap ply 9 is replaced by a second full width cap ply 10A formed from fabric according to the invention.

The use of the fabric according to the invention reduces the likelihood of a breakdown of adhesion occurring in the shoulder area of the tire due to the flexibility gradient provided by the square construction of the fabric. Furthermore, the open square construction improves the mechanical adheson properties and the tackified finish improves the chemical adhesive properties thereby providing a stable tire construction.

The present invention also provides for cost savings in that it reduces the weight of fabric in the tire and in particular reduces the requirement for calendered tire cord. It facilitates the tire building operation by use of the tackified finish and it enables a reduction in the overall weight of the tire while not adversely affecting its ride comfort, noise or rolling resistance.

The above described embodiments are given for the purpose of illustration only. Improvements and modification may be made to those embodiments without departing from the scope of the invention.

What is claimed is:

1. A pneumatic tire comprising: a carcass having at least one ply of tire cord, at least one belt ply extending circumferentially of the tire and a shoulder cap ply over and in contact with said ply of tire cord, said cap ply being a fabric of open square weave construction and having a tackified finish, said open weave fabric having a warp set of about 12-130 threads per decimeter and a weft set of about 15-70 threads per decimeter, said cap ply being an open weave fabric with the yarns having counts in the range of 440 to 2500 decitex, said cap ply being adhered directly to said tire cord ply and said belt ply.

2. A tire according to claim 1 wherein the warp set is 48 threads per decimeter and the weft set is 22 threads perdecimeter.

3. A tire according to claim 2 wherein the warp is polyester yarn having a count of 1100 decitex and the weft is textured nylon having a count of 470 decitex.

4. The tire of claim 3 wherein said tackified finish is a blend of resin and rubber latices.

5. The tire of claim 3 wherein said tackified finish is a unvulcanized rubber compound.

6. The tire of claim 1 wherein the shoulder cap ply extends the entire width of the belt ply.

* * * * *